US006332440B1

(12) United States Patent
Nagai et al.

(10) Patent No.: US 6,332,440 B1
(45) **Date of Patent: *Dec. 25, 2001**

(54) FOUR-STROKE CYCLE INTERNAL COMBUSTION ENGINE

(75) Inventors: Noboru Nagai, Hachiouji; Yumin Liu, Fussa; Tsuneo Araki, Tokyo, all of (JP)

(73) Assignee: Kioritz Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/447,808

(22) Filed: Nov. 23, 1999

(30) Foreign Application Priority Data

Nov. 27, 1998 (JP) .............................................. 10-336896

(51) Int. Cl.$^7$ .............................. F01L 1/053; F16H 7/02

(52) U.S. Cl. .................................. 123/90.31; 123/90.33; 123/196 R

(58) Field of Search .......................... 123/90.31, 196 W, 123/196 R, 90.33, 90.34, 90.38

(56) References Cited

U.S. PATENT DOCUMENTS 4,395,980 * 8/1983 Tominaga et al. ................ 123/90.27
4,553,473 * 11/1985 Ichida et al. ........................... 92/261
4,750,455 * 6/1988 Ebesu ............................... 123/90.31
5,014,655 * 5/1991 Ampferer .......................... 123/90.31
5,295,459 * 3/1994 Suzuki et al. ..................... 123/90.31
5,447,127 * 9/1995 Luck et al. ........................ 123/90.31
5,755,194 5/1998 Moorman et al. .............. 123/196 W
5,857,441 * 1/1999 Yonezawa et al. ............. 123/196 R
5,947,068 9/1999 Araki ................................ 123/90.31
5,960,764 10/1999 Araki ................................ 123/196 R
6,000,373 * 12/1999 Woodhouse ...................... 123/196 R
6,098,582 8/2000 Araki ................................ 123/90.31

FOREIGN PATENT DOCUMENTS 8-268310 5/1998 (JP) .

* cited by examiner

*Primary Examiner*—Weilun Lo
(74) *Attorney, Agent, or Firm*—Jacobson Holman, PLLC

(57) ABSTRACT

The four-stroke cycle internal combustion engine for portable working machines, which employs a toothed belt in the power transmission mechanism thereof, is disclosed. There is provided an OHC type four-stroke cycle internal combustion engine including a power transmission mechanism disposed vertically along a cylinder portion for transmitting the rotation of a crankshaft to a camshaft, wherein the power transmission mechanism comprises intermediate transmission members linked to the camshaft through a toothed belt and a rotation speed transmission member for reducing the rotation speed from the crankshaft and for transmitting it to the intermediate transmission members.

2 Claims, 4 Drawing Sheets

FOUR-STROKE CYCLE INTERNAL COMBUSTION ENGINE

BACKGROUND OF THE INVENTION

The present invention relates to a four-stroke cycle internal combustion engine, and in particular, to a four-stroke cycle internal combustion engine equipped with an OHC type valve drive mechanism which is suitable to be used for portable working machines or the like.

DESCRIPTION OF THE PRIOR ART

Recently, there has been an increasing demand for utilizing a four-stroke cycle internal combustion engine in portable working machine such as a portable grass trimmer, a chain saw or the like, in order to reduce noise and make the exhaust gas cleaner.

As means for transmitting rotation from the crankshaft to the camshaft, it has been known to use a toothed belt in an automotive four-stroke cycle internal combustion engine.

However, a four-stroke cycle internal combustion engine used in a portable working machine generally is rotatably driven at a high speed of over 7,000 to 10,000 r/min. It is generally structured so that inlet and exhaust valves are opened and closed by a rocker arm which is swung by a push rod, as disclosed in, for example, Japanese Patent Laid-open Publication No. Hei 8-260915. The power transmission mechanism with a toothed belt which is employed in an automotive engine or the like is suitable for use in a four-stroke cycle internal combustion engine for a portable working machine in the respect that it enables reduction of the weight of the machine and simplifying the structure thereof. However, such a four-stroke cycle internal combustion engine has hardly been put into practice because of poor durability due to the high speed of the four-stroke cycle internal combustion engine as described above. In addition, the toothed belt generally needs a tensioner. Therefore, the overall structure becomes complicated, more time and labor are required in assembly and further, the entire size of the working machine becomes larger. Therefore, it has been difficult to actually apply such a belt system to a four-stroke cycle internal combustion engine of a portable working machine of the type which is lifted up and held by an operator.

The object of the present invention is to provide a novel four-stroke cycle internal combustion engine with a toothed belt for a portable working machine or the like where it has previously been difficult to employ the toothed belt in a power transmission mechanism thereof.

SUMMARY OF THE INVENTION

The object of the present invention described above can be achieved by an OHC type four-stroke cycle internal combustion engine comprising: a cylinder portion; a crankshaft; a camshaft; and a power transmission mechanism disposed vertically along the cylinder portion and for transmitting rotation of the crankshaft to the camshaft, the power transmission mechanism having an intermediate transmission member which is drivably connected to the camshaft via a toothed belt, and a rotation speed transmission member for transmitting the rotation speed of the crankshaft to the intermediate transmission member.

The four-stroke cycle internal combustion engine of the present invention operates as follows. When the OHC type four-stroke cycle internal combustion engine is actuated, the crankshaft is rotatably driven by upward and downward movement of a piston. The rotation speed of the crankshaft is reduced by a rotation speed transmission member of the power transmission mechanism and is transmitted to the intermediate transmission member. Further, the rotation is transmitted from the intermediate member to the camshaft via the toothed belt.

In accordance with a four-stroke cycle internal combustion engine of the present invention, since the rotation speed transmission member is disposed between the crankshaft and the camshaft and the rotation of the crankshaft is transmitted by the rotation speed transmission member to the intermediate transmission member, the load exerted on the toothed belt, which runs between the intermediate transmission member and the camshaft, is reduced, whereby the durability of the toothed belt is improved. This allows the practical application of the toothed belt to a four-stroke cycle internal combustion engine running at high speed. Further, since the rotation speed transmitted from the crankshaft can be reduced to a predetermined value by the rotation speed transmission member, the diameter of a toothed driven pulley attached to the camshaft need not be made larger to reduce the rotation speed, whereby the size of a portion of the engine in the vicinity of a valve mechanism can be reduced, which allows the entire size of the four-stroke cycle internal combustion engine to be smaller.

In addition, since a toothed belt which does not slip is employed, the power transmission mechanism can be disposed inside a lubricating oil mist passage and no design restriction is placed thereon in this regard.

DESCRIPTION OF THE PREFERRED EMBODIMENTS

The preferred embodiments of the present invention will be described in connection with a portable grass trimmer as an example of portable working machines with reference to the attached drawings.

Figure 1:
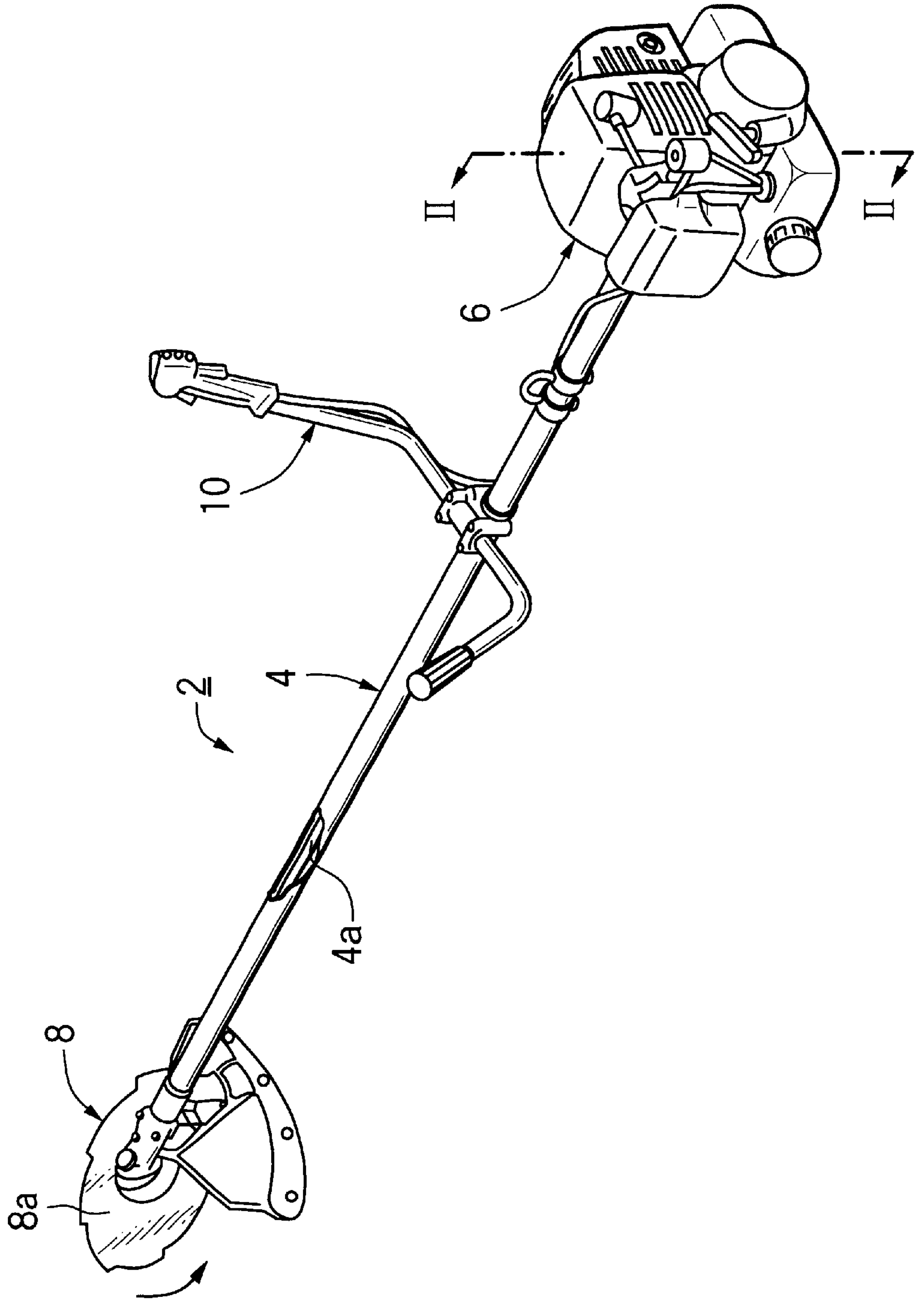
FIG. 1 is an overall perspective view of a portable grass trimmer.

As shown in FIG. 1, a portable grass trimmer 2 includes a supporting tube 4 which has a power transmitting shaft **4*a* inserted therein, a four-stroke cycle internal combustion engine 6 disposed at a rear end of the supporting tube 4, and a working section 8 at a front end thereof. The working section 8 is equipped with a cutting blade 8*a* which rotates to cut weeds in a direction indicated by an arrow. The rotational force from the four-stroke cycle internal combustion engine 6 is transmitted via a centrifugal clutch 120 (see FIG. 3) or the like, to the power transmitting shaft 4*a* to rotate the cutting blade 8*a*. An operator holds a handle section 10, which is attached to a middle portion of the supporting tube 4**, by both hands to cut the weeds.

Figure 2:
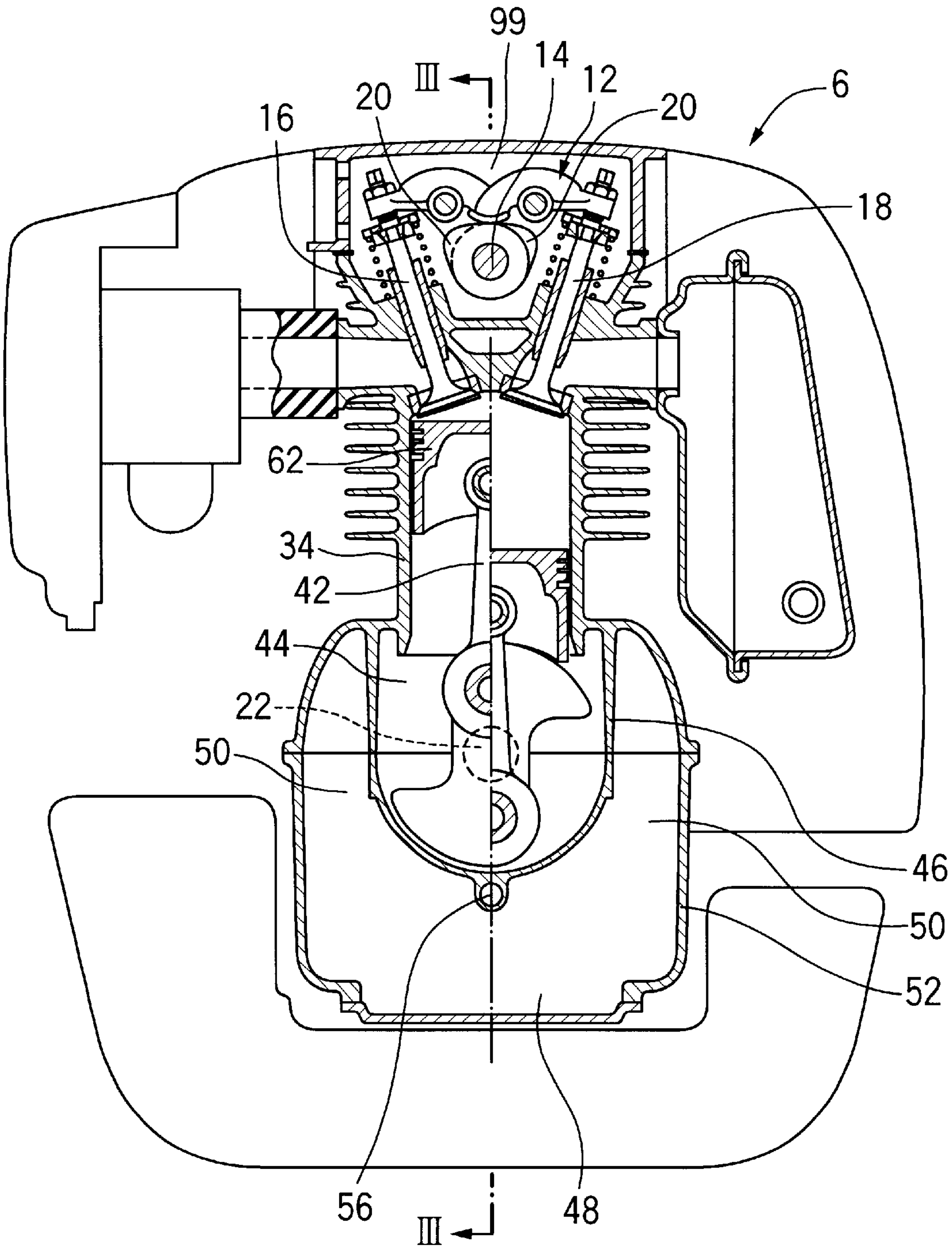
FIG. 2 is a cross-sectional view taken along a line II—II of FIG. 1, illustrating a four-stroke cycle internal combustion engine of an embodiment according to the present invention.
Figure 3:
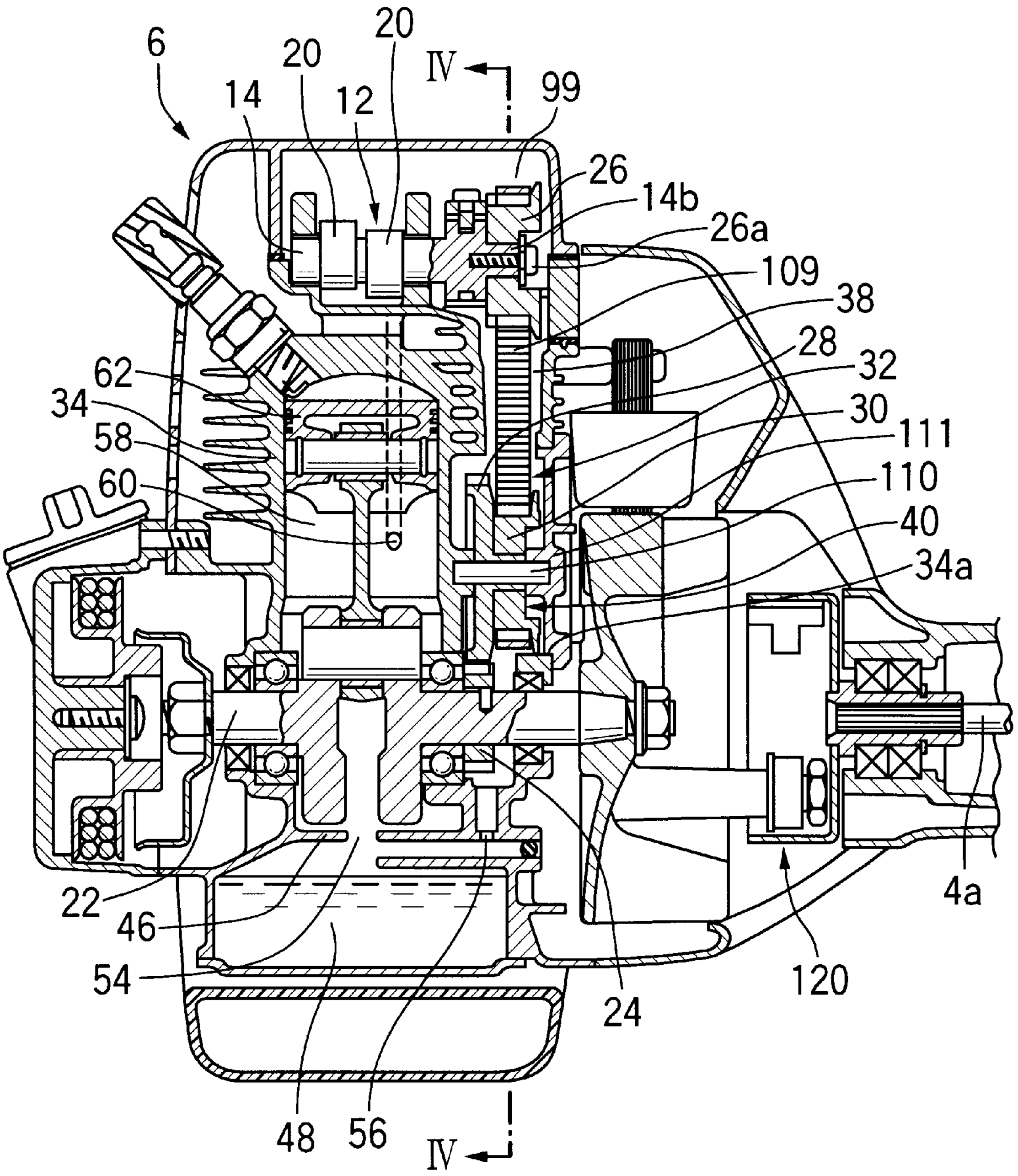
FIG. 3 is a cross sectional view taken along a line III—III of FIG. 2, illustrating a four-stroke cycle internal combustion engine of an embodiment according to the present invention.
Figure 4:
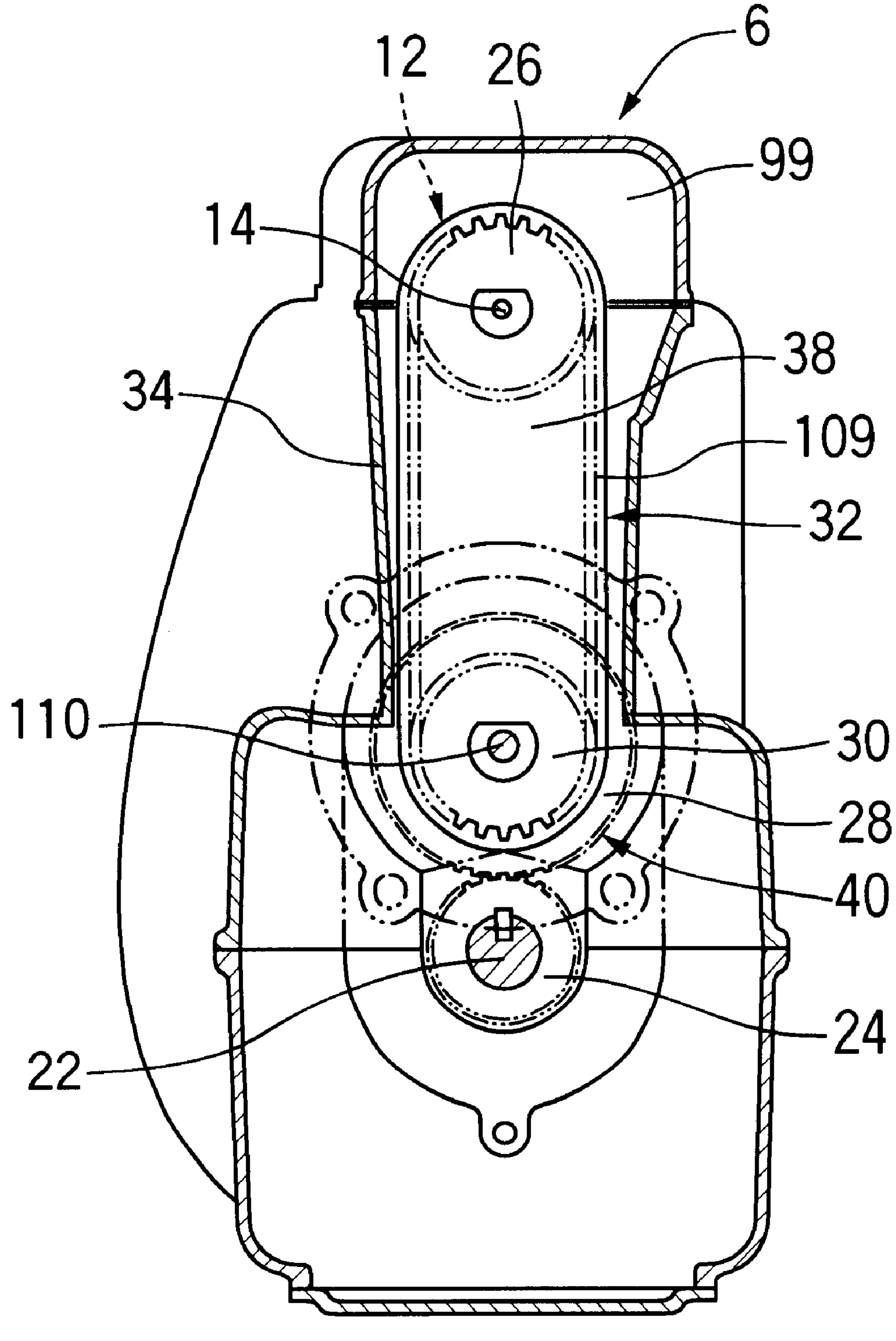
FIG. 4 is a detailed sectional view taken along a line IV—IV of FIG. 3, illustrating a power transmission mechanism.

The four-stroke cycle internal combustion engine 6 of the present embodiment shown in FIGS. 2 and 3, is of an air-cooled type and employs an SOHC type valve mechanism 12 in which two cam portions 20, 20 are formed on a camshaft 14 for an inlet valve 16 and an exhaust valve 18, respectively.

As can be seen in FIG. 3, a crank gear 24 constituting a rotation speed transmission member 40 is attached to a crankshaft 22, and a toothed pulley 26 for driving the camshaft 14 is fixed by a screw 26*a* to a front end 14*b* of the camshaft 14 coaxially therewith. An intermediate transmission member or a support shaft 110 is disposed between the crankshaft 22 and the camshaft 14 in parallel therewith. An intermediate gear 28 which meshes with the crank gear 24 to constitute the rotation speed transmission member 40 is rotatably supported on the support shaft 110. Since the diameter ratio of the intermediate gear 28 to the crank gear 24 is 2:1, that is, the ratio of the number of teeth is also 2:1, the rotation speed from the crank shaft 22 is reduced by one-half before being transmitted to the intermediate gear 28.

Further, in front of the intermediate gear 28 adjacent thereto, that is, on the cutting blade 8*a* side thereof (the right side in FIG. 3), an intermediate toothed pulley 30 supported coaxially with the support shaft 110 is disposed so as to rotate together with the intermediate gear 28. Further, a toothed belt 109 is provided between and around the intermediate toothed pulley 30 and the camshaft drive toothed pulley 26. Since the intermediate toothed pulley 30 and the camshaft drive toothed pulley 26 have the same diameter, the rotation speed of the intermediate toothed pulley 30 is directly transmitted to the camshaft 14 without any change in the speed (a ratio of the number of revolutions =1). That is, the camshaft 14 is driven to rotate synchronously with the rotational movement of the crankshaft 22 and at a half the rotation speed thereof.

The power transmission mechanism 32 is arranged in front of and vertically along a cylinder portion 34 of the four-stroke cycle internal combustion engine 6. The power transmission mechanism 32 is housed in a power transmission mechanism chamber 38 which is formed in front of and extending straight vertically along the front side of the cylinder portion 34. The power transmission mechanism chamber 38 works as a lubricating oil mist passage.

The support shaft 110 is supported so as not to rotate by a front side portion of the cylinder portion 34 and a blind cover 111 which covers an assembling port 34*a* for installing the intermediate gear 28 and the intermediate toothed pulley 30.

Further, as shown in FIG. 2, the four-stroke cycle internal combustion engine 6 has an inner wall 46 which defines a crankcase 44 surrounding a connecting rod 42 on both the left and right sides and the lower side thereof, and an outer wall 52 which surrounds the inner wall 46 with upper ends thereof connected to the inner wall 46 so as to define an oil reserving area 48 below the crankcase 44 and oil recess areas 50, 50 on both sides of the crankcase 44. A slit 54(see FIG. 3) is formed on the inner wall 46 to introduce the oil mist from the oil reserving area 48 into the cylinder portion 34. The four-stroke cycle internal combustion engine 6 of the trimmer 2 according to the present embodiment is sometimes used in a tilted or upside-down position when an operator uses the cutting blade 8*a* to cut weeds located higher than the operator's waist or branches above the operator's head. In such a case, the oil stored in the oil reserving area 48 formed below the crankcase 44 flows into the oil recess areas 50, 50 formed on both sides of the crankcase 44 to prevent a substantial amount of oil from flowing directly into the crankcase 44 through the slit 54.

As can be seen in FIGS. 2 and 3, an oil mist suction port 56 for introducing the oil mist from the oil reserving area 48 is formed in the wall of the oil reserving area 48 on the side of the inner wall 46 for lubricating the rotation speed transmission member 40 and the valve mechanism 12. The oil mist suction port 56 communicates, via the power transmission mechanism chamber 38 and a cam chamber 99 where the valve mechanism 12 is housed, with an oil mist exhaust port 60 which is open to the inside of a cylinder bore 58. The oil mist is delivered from the oil reserving area 48 into the power transmission mechanism 32 and the valve mechanism 12 by the pressure change generated by the up-and-down stroke of a piston 62.

The four-stroke cycle internal combustion engine 6 according to the present embodiment structured as described herein-above functions as follows.

First, when the four-stroke cycle internal combustion engine 6 is actuated, the piston 62 moves upward and downward to rotate the crankshaft 22. The crankshaft 22 is typically revolves at a high speed over 7,000 to 10,000 r/min. The crank gear 24 attached to the crankshaft 22 is rotated at the same speed as the crankshaft 22 and the rotation is transmitted to the intermediate gear 28 meshed with the crank gear 24. As described above, since the number of teeth of the intermediate gear 28 supported by the support shaft 110 is twice as many as that of the crank gear 24, the rotation speed from the crankshaft 22 is transmitted to the intermediate toothed pulley 30 while reduced by half. Further, the rotation of the intermediate toothed pulley 30 is transmitted via the toothed belt 109 to the camshaft drive toothed pulley 26 at the same speed, that is, at the half of the rotation speed of the crankshaft 22. When the camshaft drive toothed pulley 26 is rotated, the camshaft 14 is turned whereby the valve mechanism 12 is driven.

In the present embodiment, since the ratio of the number of teeth of the intermediate gear 28 to the crank gear 24 is 2:1, that is, the rotation speed from the crank shaft 22 is reduced by half and transmitted to the intermediate toothed pulley 30, and the toothed belt 109 is driven at a speed reduced by the intermediate toothed pulley 30, the load exerted on the toothed belt 109 is greatly reduced, whereby the durability thereof can be improved. It enables the practical application of the power transmission mechanism 32 with the toothed belt 109 to a four-stroke cycle internal combustion engine 6 which runs at a high speed.

Further, in the present embodiment, since the diameter of the camshaft drive toothed pulley 26 attached to the camshaft 14 can be reduced by half, the upper portion of the four-stroke cycle internal combustion engine 6 can be designed to be more compact compared with the case where the rotation speed transmitted from the crankshaft 22 is reduced by half by directly engaging the crankshaft 22 with the camshaft 14. Therefore, the entire size of the four-stroke cycle internal combustion engine 6 can be made smaller. The intermediate gear 28 having a large diameter can be accommodated in the existing space of the conventional engine housing because the intermediate gear 28 is located in the central part of the engine main body.

If the crankshaft and the camshaft were directly engaged with each other so as to reduce the rotation speed by half, the diameter of the pulley on the crankshaft side would have to be made as small as possible because the space on the camshaft side is limited. On the contrary, since the present embodiment employs a 1-to-1 reduction system, the diameter of the pulley on the crankshaft side can be large. In short, the diameter of the pulley of the crankshaft side can be in the size of the diameter of the pulley on the camshaft side for the case of the directly engaging gear system. It enables the load applied to the belt to be reduced by half, whereby the belt durability can be greatly improved in addition to the improvement of durability due to the reduction by half in the revolution number described above.

Further, in the present embodiment, since the toothed belt 109 is provided between and around the camshaft drive toothed pulley 26 and the intermediate toothed pulley 30 which is disposed between the crankshaft 22 and the camshaft 14, the distance between the pulley shafts between which the toothed belt 109 is extended can be made shorter and this allows a tensioner for the toothed belt 109 to be omitted.

Further, in the present embodiment, since the toothed belt 109 causes no slippage, the toothed belt 109 can be disposed inside the oil mist lubracating passage 38 for lubricating the reduction means 40 and the valve mechanism 12. Therefore, no design restrictions are imposed thereby.

The present invention has thus been shown and described with reference to specific embodiments. However, it should be noted that the present invention is in no way limited to the details of the described arrangements but changes and modifications may be made without departing from the scope of the appended claims.

For example, in the present embodiment, it is preferable that the intermediate toothed pulley 30 is disposed between the crankshaft 22 and the camshaft 14 to shorten the center distance of the pulley shafts for the toothed belt 109 so as to make a tensioner for the toothed belt 109 unnecessary. However, from the viewpoint of reducing the rotation speed from the crankshaft 22 by half and transmitting it to the camshaft 14, the intermediate toothed pulley 30 may be located anywhere so long as it can be engaged with the crank gear 24, for example, it might be located below the crank gear 24.

Further, for the purpose of improving the durability of the toothed belt 109, it is acceptable as far as the reduced rotation speed from the crankshaft is transmitted thereto. Therefore, the reduction ratio of two gears 24, 28 in the reduction means 40 does not necessarily have to be 1:2, and it may be within the range of, for example, 1:1 to 1:2. In this case, to reduce the number of revolution of the camshaft 14 to half of that of the crankshaft 22, the ratio of the diameters of the toothed pulleys 26, 30 may be adjusted.

What is claimed is:

1. An OHC type four-stroke cycle internal combustion engine to be used in a portable working machine, said engine comprising:

a cylinder portion;

a crankshaft;

a camshaft;

a power transmission mechanism for transmitting rotation of said crankshaft to said camshaft, said power transmission mechanism having a first gear attached to said crankshaft, a second gear meshing with said first gear, a first toothed pulley arranged coaxially with said second gear and a second toothed pulley attached to said camshaft, and a toothed timing belt provided between said first and second toothed pulleys, said first and s econd gears and said first and second pulleys being vertically arranged, a diameter ratio of said second gear to said first gear being substantially 2:1 and a diameter ratio of said second toothed pulley to said first toothed pulley is substantially 1:1 so that the camshaft rotates at half a rotation speed of the crankshaft to reduce a load exerted on the timing belt and increase its durability; and a housing surrounding said cylinder portion, said crankshaft, said camshaft and said power transmission mechanism, said housing having an oil reserving area for accommodating oil, a cam chamber in which said camshaft is disposed, an oil mist lubricating passage in which said power transmission mechanism is disposed, said oil mist lubricating passage being in communication with said oil reserving area and said cam chamber so that oil mist generated in said oil reserving area is supplied to said cam chamber.

2. An OHC type four-stroke cycle internal combustion engine according to claim 1, wherein said second gear and said first toothed pulley are disposed between said crankshaft and said camshaft.

* * * * *